United States Patent
Lei et al.

(10) Patent No.: US 7,791,451 B2
(45) Date of Patent: Sep. 7, 2010

(54) METHODS, SYSTEMS, AND COMPUTER PROGRAM PRODUCTS FOR PROVIDING MUTUAL AUTHENTICATION FOR RADIO FREQUENCY IDENTIFICATION (RFID) SECURITY

(75) Inventors: Hui Lei, Danbury, CT (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 879 days.

(21) Appl. No.: 11/550,091

(22) Filed: Oct. 17, 2006

(65) Prior Publication Data

US 2008/0106386 A1    May 8, 2008

(51) Int. Cl.
G06K 19/00 (2006.01)
H04L 9/14 (2006.01)
H04L 9/32 (2006.01)

(52) U.S. Cl. .................. 340/5.2; 340/10.1; 340/10.3; 340/10.4

(58) Field of Classification Search .................. 340/5.2, 340/5.26, 5.86, 10.1, 10.3, 10.4, 10.51, 572.1–572.9
See application file for complete search history.

(56) References Cited

U.S. PATENT DOCUMENTS

| | | | | |
|---|---|---|---|---|
| 5,467,081 | A * | 11/1995 | Drews et al. | 340/5.22 |
| 6,172,596 | B1 * | 1/2001 | Cesar et al. | 340/10.41 |
| 6,843,106 | B2 | 1/2005 | Swersey et al. | |
| 6,860,422 | B2 * | 3/2005 | Hull et al. | 235/376 |
| 6,919,793 | B2 * | 7/2005 | Heinrich et al. | 340/10.32 |
| 7,503,480 | B2 * | 3/2009 | Barnes et al. | 235/377 |
| 7,548,152 | B2 * | 6/2009 | Hillier | 340/5.61 |
| 7,634,427 | B1 * | 12/2009 | Kennedy | 705/26 |
| 2002/0116274 | A1 * | 8/2002 | Hind et al. | 705/23 |
| 2004/0066278 | A1 | 4/2004 | Hughes et al. | |
| 2004/0222878 | A1 | 11/2004 | Juels | |

(Continued)

OTHER PUBLICATIONS

Weis, Stephen A., Security and Privacy in Radio-Frequency Identification Devices, May 9, 2003, Massachusetts Institute of Technology.*

(Continued)

*Primary Examiner*—Brian A Zimmerman
*Assistant Examiner*—Ryan W Sherwin
(74) *Attorney, Agent, or Firm*—Cantor Colburn LLP; William Kinnaman

(57) ABSTRACT

Methods, systems and computer program products for providing mutual authentication for radio frequency identification (RFID) security. Methods include receiving an authentication request at a RFID tag from a requester, where the request includes an encrypted access role. An encrypted secret message is transmitted to the requestor in response to receiving the authentication request. The encrypted secret message is based on the encrypted access role received from the requester. An access request specifying a work area and including a random number that is encrypted is received from the requester at the RFID tag. The access request was generated by the requester in response to the RFID tag being successfully authenticated by the requestor using the encrypted secret message. The requester is authenticated at the RFID tag. The authenticating includes determining the value of the random number sent by the requester and verifying that the work area is valid for the encrypted access role. If the authenticating is successful, the RFID tag responds to the access request using the value of the random number as an encryption key.

17 Claims, 6 Drawing Sheets

FIG. 2

U.S. PATENT DOCUMENTS

| | | |
|---|---|---|
| 2005/0171898 A1* | 8/2005 | Bishop et al. .................. 705/39 |
| 2006/0022799 A1 | 2/2006 | Juels |
| 2006/0059367 A1 | 3/2006 | Yarvis |
| 2006/0061482 A1 | 3/2006 | Monney et al. |
| 2007/0008070 A1* | 1/2007 | Friedrich ................... 340/10.1 |
| 2007/0105618 A1* | 5/2007 | Steil ............................ 463/25 |
| 2007/0109124 A1* | 5/2007 | Park et al. ................. 340/572.1 |

OTHER PUBLICATIONS

Ohkubo, Miyako, et al, "Cryptographic Approach to 'Privacy-Friendly' Tags", RFID Privacy Workshop, MIT, 2003.

Luo, Zongwei, et al, "A Lightweight Mutual Authentication Protocol for RFID Networks", IEEE Conference paper, Oct. 18, 2005.

* cited by examiner

METHODS, SYSTEMS, AND COMPUTER PROGRAM PRODUCTS FOR PROVIDING MUTUAL AUTHENTICATION FOR RADIO FREQUENCY IDENTIFICATION (RFID) SECURITY

BACKGROUND OF THE INVENTION

This invention relates generally to radio frequency identification (RFID), and more particularly to providing security in a RFID system.

Radio Frequency Identification (RFID) is an emerging and useful tool in manufacturing, supply chain management and inventory control. There are two key elements in a RFID system: a RFID tag, or transponder, that carriers object-identifying data; and a RFID reader, or transceiver, that reads and writes tag data. Basically, the tag reader broadcasts a radio frequency signal to access information stored on the tags nearby. This information can range from static identification numbers to user written data or data computed by the tag. Tags respond by transmitting back resident data, typically including a unique serial number or electronic product code (EPC), to the reader.

The availability of a low cost RFID tag, which may be referred to as a passive tag, is one of the reasons for widespread adoption of the RFID technology. However, the deployment of such tags may create new threats to user privacy due to the powerful tracking capability of the tags. As a result, it would be useful to implement a security scheme on the passive tags for addressing the privacy problem associated with RFID tags. However, providing security in RFID tags is a challenging task because they are highly resource constrained and cannot support strong cryptography.

RFID tags themselves have no access control function, thus, any reader can freely obtain information from them. Another security issue is related to the fact that since the communication between a tag and a reader is by radio, anyone can access the tag and obtain its output (e.g., attackers can eavesdrop on the communication channel between tags and readers). It would be desirable for a RFID system to provide an authentication scheme to protect the data passing between the tag and the reader by providing some kind of encryption capability.

Several solutions to providing RFID system security have been proposed. Some approaches entail using an extra device such as a Faraday cage, a blocker tag and active jamming. A Faraday cage is a container made of metal mesh or foil that is impenetrable by radio signals of certain frequencies. The Faraday cage protects the RFID tag from being read. It is easy to predict that RFID tags will inevitably see use in a vast range of objects that cannot be placed conveniently in containers, for example on clothing, in wrist watches, and even possibly on or in human beings. A blocker tag is a device that simulates the full spectrum of possible serial number tags, thereby obscuring the serial numbers of other tags. The use of active jamming involves having the consumer carry a device that actively broadcasts radio signals so as to block and/or disrupt the operation of any nearby RFID readers. In certain locations or applications, the use of active jamming to block or disrupt other systems may be illegal depending on the applicable government regulations. These three approaches to providing security in a RFID system require an additional device to be operated besides the tags and readers, and none of them provide a robust or easy to implement solution for providing security in an RFID system.

Other approaches to providing RFID system security may be referred to as radio frequency modification approaches. One such approach is to have the readers employing random frequencies so that unauthorized users may not easily detect the traffic or perform eavesdropping. Another method involves having the tags changing frequencies by utilizing specially designed tags to transmit signals over a reserved frequency indicating that they are being modified. Drawbacks of radio frequency modification approaches is that they imply changing runtime radio frequency, which means that complex circuits will be required and therefore, the cost of building such a device will be relative high. The cost of a tag is an important factor for the widespread adoption of a RFID solution in industry.

Another method may be referred to as the "kill tag" approach and it involves killing, or deactivating, RFID tags before they are put in the hands of consumers (e.g., when a product with a tag is purchased). A killed tag can never be reactivated and thus, this approach would not support the ability to scan the RFID tag when/if a product is returned to the place of purchase.

Due to the expected increase in the use of passive RFID tags, it would be desirable to implement a low cost security scheme for an RFID system that avoids the drawbacks of the current approaches described above.

BRIEF SUMMARY OF THE INVENTION

Embodiments include methods for providing mutual authentication for radio frequency identification (RFID) security. A method includes receiving an authentication request at a RFID tag from a requester, where the request includes an encrypted access role. An encrypted secret message is transmitted to the requester in response to receiving the authentication request. The encrypted secret message is based on the encrypted access role received from the requester. An access request specifying a work area and including a random number that is encrypted is received from the requester at the RFID tag. The access request was generated by the requestor in response to the RFID tag being successfully authenticated by the requester using the encrypted secret message. The requestor is authenticated at the RFID tag. The authentication includes determining the value of the random number sent by the requester and verifying that the work area is valid for the encrypted access role. If the authentication is successful, the RFID tag responds to the access request using the value of the random number as an encryption key.

Additional embodiments include systems for providing a mutual authentication protocol for RFID networks. A system includes an RFID tag that includes one or more secret messages, one or more work areas, one or more hash functions for encrypting data and instructions. The instructions facilitate receiving an authentication request at the RFID tag from a requestor. The authentication request includes an encrypted access role. An encrypted secret message is transmitted to the requester in response to receiving the authentication request. The encrypted secret message is created at the RFID tag by encrypting one of the secret messages corresponding to the encrypted access role. An access request specifying one of the work areas on the RFID tag and including a random number that is encrypted is received from the requester at the RFID tag. The access request was generated by the requester in response to the RFID tag being successfully authenticated by the requestor using the encrypted secret message. The requester is authenticated at the RFID tag. The authentication includes determining the value of the random number sent by the requestor and verifying that the work area is valid for the encrypted access role. If the authentication is successful, the RFID tag responds to the access request using the value of the random number as an encryption key.

Further embodiments include computer program products for providing mutual authentication for RFID security. A computer program product includes a storage medium readable by a processing circuit and storing instructions for execution by the processing circuit for facilitating a method. The method includes receiving an authentication request at a RFID tag from a requester, where the request includes an encrypted access role. An encrypted secret message is transmitted to the requester in response to receiving the authentication request. The encrypted secret message is based on the encrypted access role received from the requester. An access request specifying a work area and including a random number that is encrypted is received from the requestor at the RFID tag. The access request was generated by the requester in response to the RFID tag being successfully authenticated by the requester using the encrypted secret message. The requester is authenticated at the RFID tag. The authentication includes determining the value of the random number sent by the requestor and verifying that the work area is valid for the encrypted access role. If the authentication is successful, the RFID tag responds to the access request using the value of the random number as an encryption key.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments provide a lightweight mutual authentication protocol for RFID systems that utilize passive tags. A backend authentication system, a RFID tag, and a RFID reader are utilized to provide the security framework where authentication is performed on both the backend system and the RFID tag.

Exemplary embodiments are designed to satisfy a requirement for indistinguishability of RFID tag output as well as a requirement for forward security. Indistinguishability refers to the requirement that the RFID tag output must be indistinguishable from truly random values. Moreover, RFID tag output should not be able to be linked to the identification of the RFID tag. Forward security refers to the requirement that even if an eavesdropper acquires the secret tag data stored on the tag, he cannot trace the data back through past events in which the tag was involved. One approach to satisfying the above security requirements is to use a public-key algorithm such as RSA. However, due to the highly resource constrained nature of a passive tag, public-key algorithms cannot be implemented on the RFID tag device.

Figure 1:
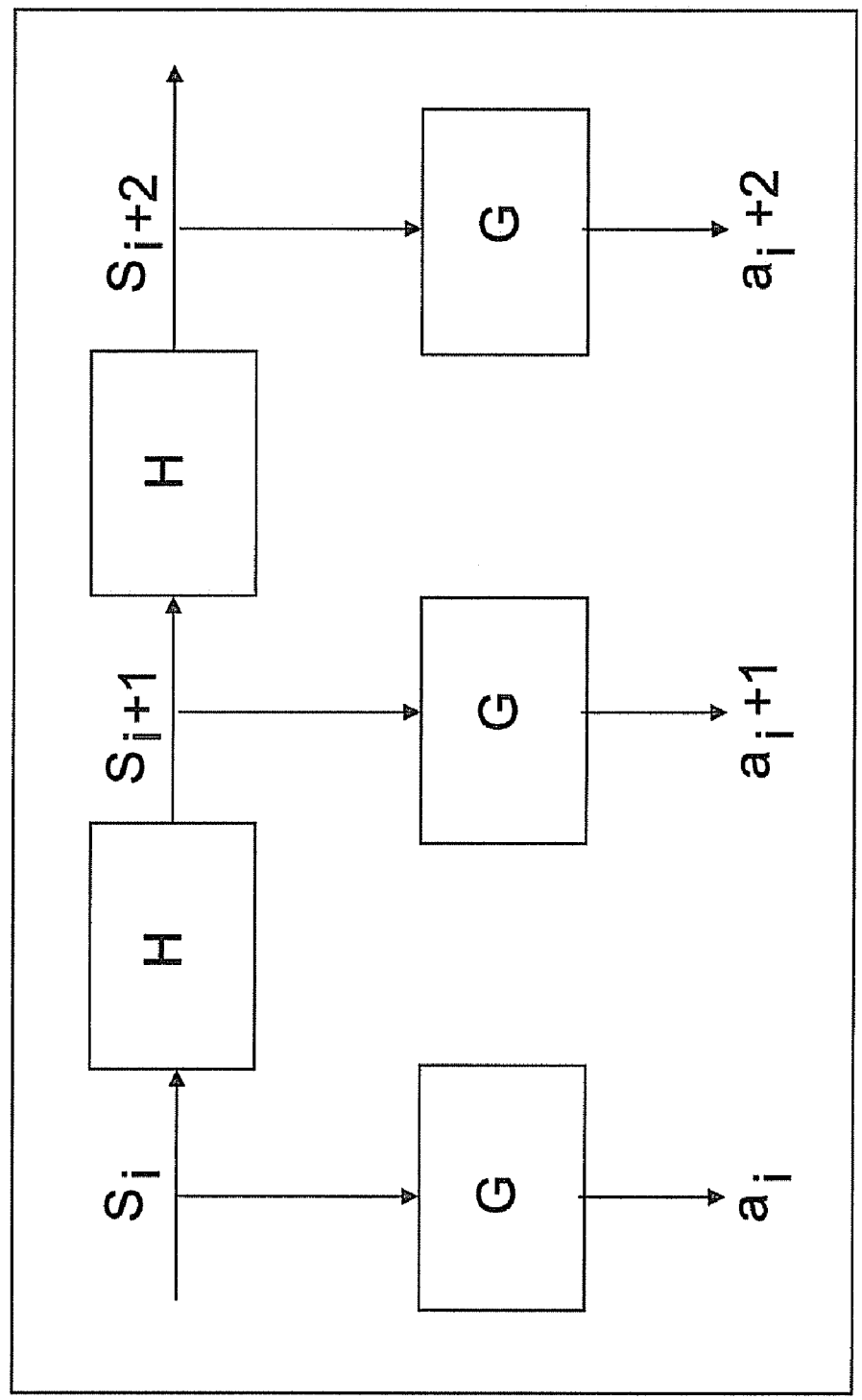
FIG. 1 depicts a prior art hash chain technique that may be utilized by exemplary embodiments.

Exemplary embodiments provide a simple security scheme that builds on a hash function RFID authentication scheme, such as the one taught by Ohkubo in an article entitled "Cryptographic Approach to 'Privacy Friendly' Tags" that was presented at the MIT RFID Privacy Workshop in 2003. FIG. 1 depicts a block diagram of Ohkubo's scheme that makes use of a hash chain technique to produce tag output to a reader given initial secret tag information. As depicted in FIG. 1, $s_i$, is the secret information being used at the $i^{th}$ transaction (read/write query) and $a_i$, is the tag output for that transaction. H and G are one-way hash functions. There are several drawbacks to the scheme depicted in FIG. 1: first, the output of the hash function solely depends on the value of $a_i$; second, it is a one-way authentication protocol; and third, a security channel is not being established between the reader and the back-end system.

An enhancement to the hash chain described in Ohkubo is utilized by exemplary embodiments for updating the RFID tag's secret information so as to achieve the forward security requirement. The additions to the Ohkubo scheme implement two-way, or mutual, authentication and enhance the indistinguishability of RFID tag output. Exemplary embodiments improve on Ohkubo by creating a non-constant tag output to make the tags more indistinguishable. The tag output of exemplary embodiments does not solely depend on $a_i$, but also on some other random parameters in order to make the tag much more indistinguishable. Additionally, exemplary embodiments create a core RFID security framework for the whole RFID network that includes a backend system, a RFID reader and a RFID tag. The backend system is mainly for verifying and processing the data transferred from or to the tag on behalf of the reader. To tackle the security concern on RFID readers, exemplary embodiments include the use of a public-key algorithm such as RSA between the reader and the backend to ensure only the authorized reader is permitted to connect to the backend system.

Figure 2:
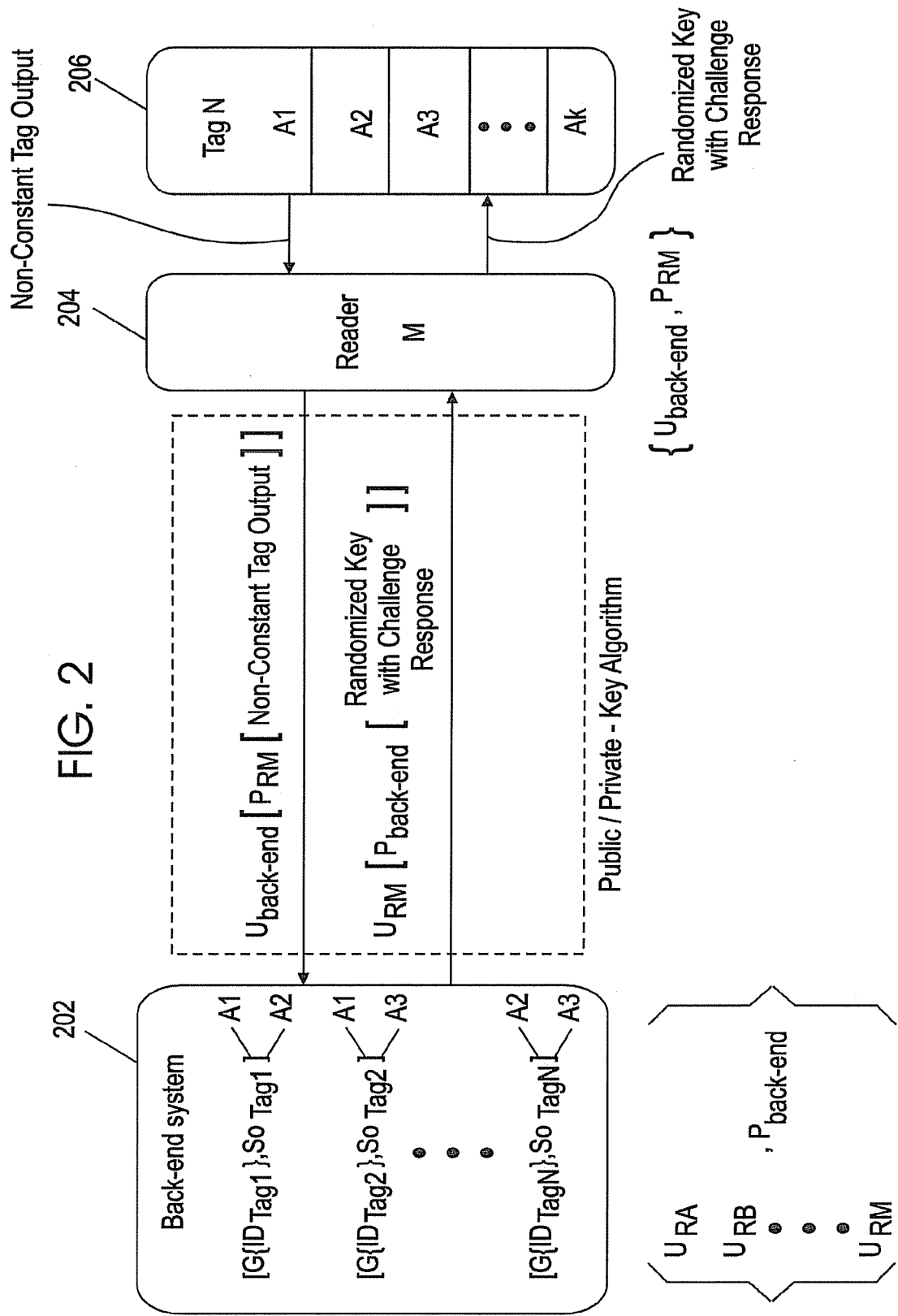
FIG. 2 depicts an exemplary system for providing RFID security.

FIG. 2 depicts an exemplary system for providing RFID security according to exemplary embodiments. A RFID tag 206 can have a number of sections, or areas (denoted as $A_1$, $A_2$, ... $A_K$) for storing the data that can be read (read access) or written (write access) by the reader. The corresponding data being stored is denoted by $D_{A1}$, $D_{A2}$, ... $D_{AK}$, respectively.

Besides the secret information and the EPC code (ID), a tag 206 also stores a transaction counter, $T_x$, which may be implemented as an eight-byte value. The transaction counter records the number of times its internal secret information is being updated via the hash function H. The initial value is 1 and it is incremented after each read or write transaction.

The backend system 202 stores a list of pairs (G{ID}; $s_0$) (instead of (ID; $s_0$)) for different tags 206. The purpose of doing this is to make the tag look up process effective and efficient without exposing the ID directly. Moreover, each pair also registers a number of sections/areas that the backend system 202 can be authorized for both read and write accesses for a specified tag 206.

Both H and G are public one-way hash functions that must be known by both the tag 206 and the backend system 202.

Both of the hash functions are computationally infeasible such that it is difficult to find x for any given y where y=H(x) or G(x).

The public key infrastructure (PKI) is assumed to be already set up between the backend system 202 and the authenticated readers 204. The backend system 202 maintains a list of public keys of authenticated readers 204 with its own private key while the readers 204 keep the public key of the backend system 202 in addition to their own private keys. As depicted in FIG. 2, $U_{RA}$ is reader A's public key, $U_{RB}$ is reader B's public key, and so on with $U_{RM}$ being reader M's public key and $P_{RM}$ being reader M's private key. $U_{back-end}$ is the public key of the backend system 202 and $P_{back-end}$ is the private key of the backend system 202.

As depicted in FIG. 2, in exemplary embodiments, the reader 204 will pass data to the backend system 202 and vice versa. Basically, the reader 204 does not contain any business logic but is used to transfer data between the backend system 202 and the tag 206. The only computation function within the reader 204 is to encrypt the data and transfer it to the backend system 202 using its own private key and the public key of the backend system 202. In contrast, the backend system 202 utilizes its private key and the public key of the reader 204 when transferring data to the reader 204. Since PKI is being used between the reader and the backend system 202, this channel is assumed to be secure against attacks from eavesdroppers. Thus, exemplary embodiments, as described herein, focus on how to set up the non-constant tag output with randomized keys within the channel between the RFID tag 206 and the reader 204 so as to address the RFID security issue.

As described previously, an exemplary RFID system includes RFID passive tags 206 that contain secret messages and work regions and utilize two hash functions. The RFID system also includes a backend system 202 that verifies and processes data transferred from or to the tag 206 via the reader 204, and a RFID reader 204 that transmits data between the tags 206 and the backend system 202.

Figure 3:
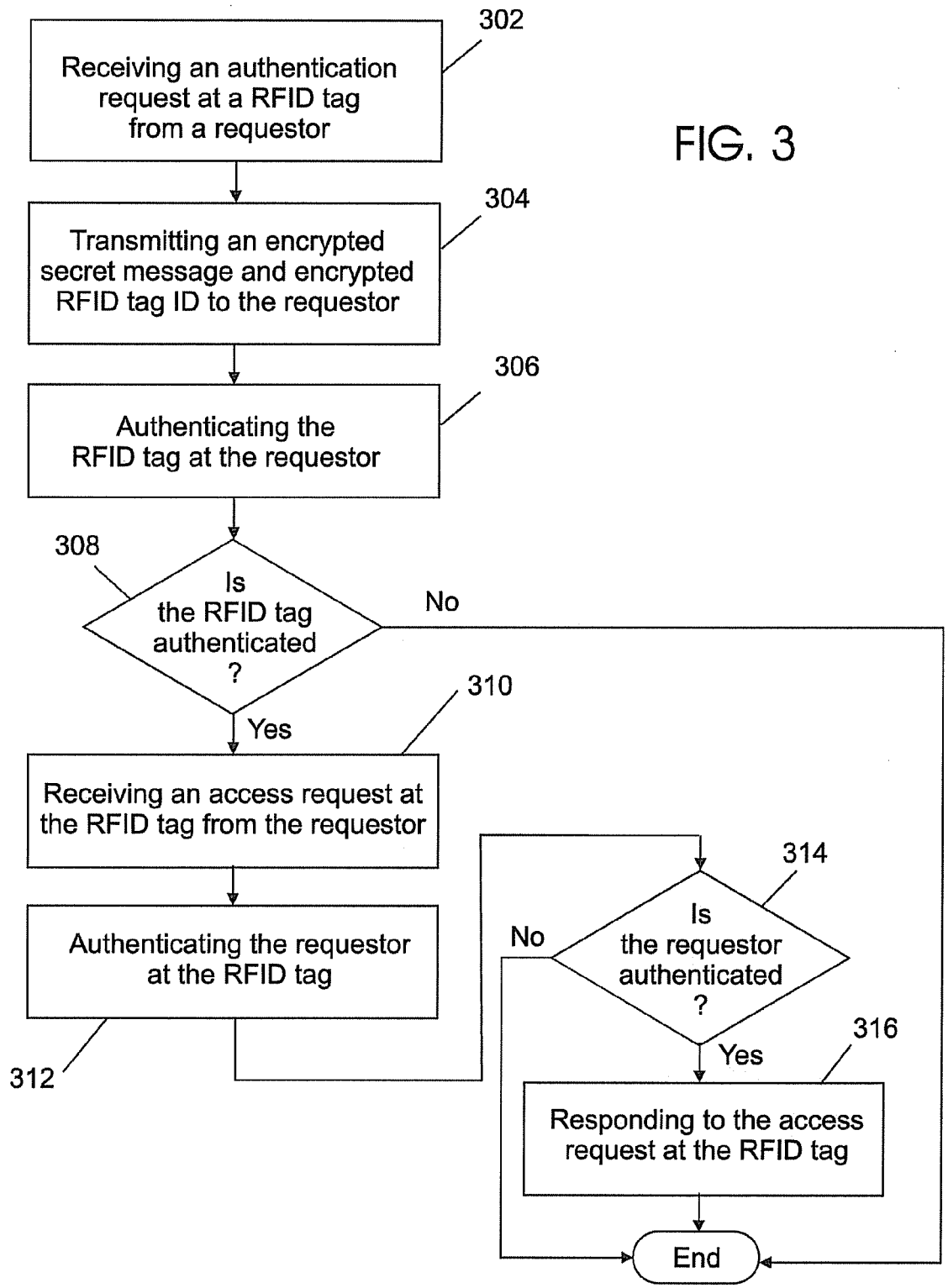
FIG. 3 depicts an exemplary process flow that may be implemented by exemplary embodiments.

FIG. 3 depicts an exemplary process flow that may be implemented by exemplary embodiments to provide a light-weight challenge-response security protocol authentication scheme for use in RFID networks, or systems. As used herein, any variable that has a superscript "b" indicates a variable that is generated by the backend server, and any variable that has "t" as a superscript indicates that it is sourced at the tag. At block 302 in FIG. 3, an authentication request is received from a requestor (e.g., a backend system 202 via a RFID reader 204). At block 304, the RFID tag 206 transmits an encrypted secret message, its encrypted RFID tag identifier, and a transaction counter to the requesting backend system 202 via the RFID reader 204. In exemplary embodiments, the RFID tag 206 sends non-constant tag output to the RFID reader 204, and the RFID reader 204 sends the non-constant tag output to the backend system 202. At block 306, the backend system 202 authenticates the RFID tag 206 based on the non-constant tag output it receives from the RFID tag 206 via a RFID reader 204. If the RFID tag 206 is successfully authenticated at the backend system 202, as determined at block 308, then the backend system 202 sends an access request including a randomized key with challenge response to the RFID reader 204, and the RFID reader 204 sends the randomized key with challenge response to the RFID tag 206.

At block 310, the RFID tag 206 receives the access request from the requester. At block 312, the RFID tag 206 authenticates the backend system 202 based on the randomized key and challenge response it received from the backend system 202 via the RFID reader 204. If the backend system 202 is successfully authenticated at the RFID tag 206, as determined at block 314, then block 316 is performed and the RFID tag 206 responds to the access request sent by the backend system 202 via the RFID reader 204. The backend system 202 is protected by a public key algorithm to allow only authorized readers 204 to be connected to the backend system 202. In addition, in exemplary embodiments such as that depicted in FIG. 3, the tag 206 responds to the backend system 202 requests by sending the transaction counter value $T_x$, the hashed output $G\{s_i \oplus T_x\}$ and its hashed RFID identifier $G\{ID_{TagN}\}$, where "i" represents the $i^{th}$ transaction, G is a one-way hash function and $\oplus$, or XOR, is an exclusive or operation, $ID_{TagN}$ is the identifier of the RFID tag 206, and $s_i$ is generated by applying a one-way hash function H to its secret message $s_0$ "$T_x$" times.

In exemplary embodiments, in response to receiving the transaction counter value $T_x$ and the hashed outputs from the tag 206 at block 306, the backend system 202 uses $G\{ID_{TagN}\}$ to look up its internal tag list for finding the corresponding secret message $s_0$. If it is found, then the backend system will generates the value "$s^b_i$" by applying the hash function, H, "$T_x$" times to the secret message, "$s_0$", that is associated with the tag 206. The hash output of $G\{s^b_i \oplus T_x\}$ is then calculated. The backend system 202 then compares the value of $G\{s^b_i \oplus T_x\}$ and $G\{s_i \oplus T_x\}$ and if they are equal the tag 206 is authenticated by the backend system 202. Once backend system 202 authenticates the tag 206, it generates a random session number $R^b_n$, and transmits output to the tag 206 including: $R^b_n \oplus G\{s^b_i\}$, $G\{S^b_i \oplus R^b_n \oplus A_j\}$ and $A_j$, where $A_j$ represents the work area of the tag 206.

In exemplary embodiments, at block 310, the tag 206 receives the access request output from the backend system 202. The access request includes $R^b_n \oplus G\{s^b_i\}$, $G\{s^b_i \oplus R^b_n \oplus A_j\}$ and $A_j$. At block 312, the tag 206 authenticates the backend system 202 by first calculating the random session number $R^b_n$ by performing XOR operations on $R^b_n$, $G\{s^b_i\}$ and its own $G\{s_i\}$, since $R^b_n \oplus G\{s^b_i\} \oplus G\{s_i\}$ equals $R^b_n$ if and only if $s^b_i$ equals $s_i$. To distinguish the source of input, $R^t_n$ is used to represent the random number used at the tag 206, where $R^b_n$ equals $R^t_n$. The tag 206 calculates the hash output $G\{s_i \oplus R^t_n \oplus A_j\}$ to see if the value is equal to $G\{s^b_i \oplus R^b_n \oplus A_j\}$. If they are equal, the backend system is authenticated by the tag 206. Once the mutual authentication is established, data can be transferred between the tag 206 and the backend system 202 at block 316. To protect the data passing in-between the tag 206 and the backend system 202, a random number session, $R^b_n$, is employed as a key for encryption. For each data transferred, the sending party (the tag 206 for the read query case, and the backend system 202 for the write query case) produces two elements $G\{R^b_n\} \oplus data$, and $G\{data\}$, where G is a one-way hash function.

Figure 4:
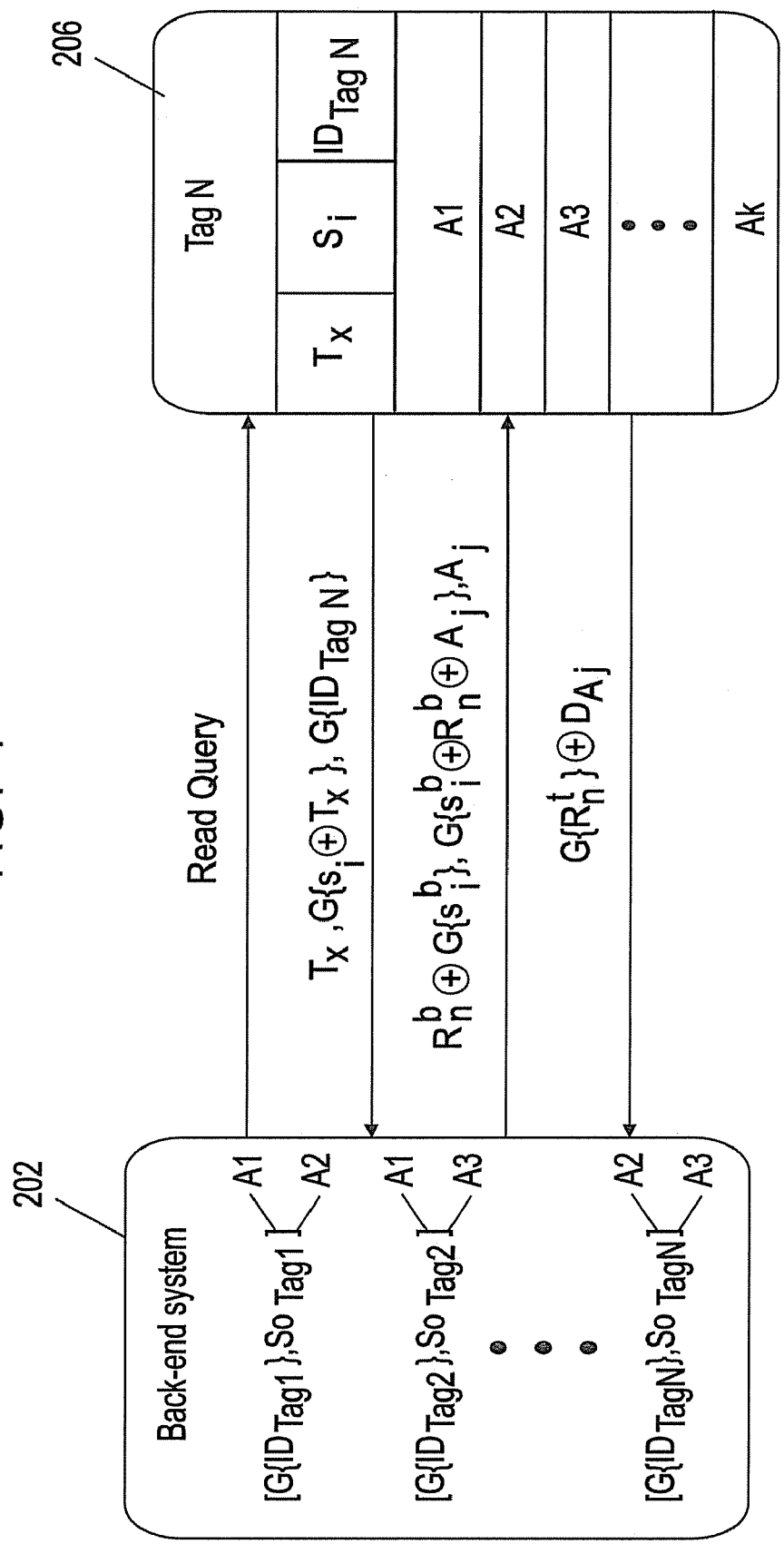
FIG. 4 is a block diagram of a read process that may be implemented by exemplary embodiments.

FIG. 4 is a block diagram of a read process that may be implemented by exemplary embodiments. First, at the $i^{th}$ transaction context, the backend system 202 sends a read query (also referred to herein as a query type of read) to the tag 206 for reading the tag's data within the section $A_j$, where j∋[1,k], and k represents the total number of sections defined in the tag. Second, the tag 206 responds with three elements including $T_x$, $G\{s_i \oplus T_x\}$ and $G(ID_{TagN})$. Third, after receiving the tag's response, the backend system 202 uses $G\{ID_{TagN}\}$ to look up its internal tag list for finding the corresponding $s_0$. If it is found, then the backend system 202 will compute the value $s^b_i = H^{Tx}\{s_0\}$ and calculates $G\{s^b_i \oplus T_x\}$ to see whether it is equal to $G\{s_i \oplus T_x\}$, the equality holds if and only if $s^b_i$ equals $s_i$. If they match with each other, then the tag 206 is authenticated from the backend system's point of view.

Fourth, once the matching tag is located, the backend system 202 generates a random session number $R^b_n$ and passes back to the tag 206 three elements including: $R^b_n \oplus G\{s^b_i\}$, $G\{s^b_i \oplus R^b_n \oplus A_j\}$ and $A_j$, where $A_j$ is the section/area that the backend system 202 is going to access. Fifth, upon receiving the session information from the backend system 202, the tag 206 will extract the random session number, $R^b_n$, from this transaction by doing an XOR on $R^b_n \oplus G\{s^b_i\}$ with its own $G\{s_i\}$ since $R^b_n \oplus G\{s^b_n\} \oplus G\{s_i\}=R^b_n$ if and only if $s^b_i$ equals $s_i$. After obtaining $R^b_n$ (also referred to herein as $R^t_n$ for distinct indistinguishable), it computes $G\{s_i \oplus R^t_n \oplus A_j\}$ and checks whether it is equal to $G\{s^b_i \oplus R^b_n \oplus A_j\}$. If they are matched with each other (occurs if and only if $s^b_i$ equals $s_i$ and $R^b n = R^t n$), the backend system 202 is authenticated at the tag 206. At this stage, the mutual authentication between the tag 206 and the backend system 202 is established.

Still referring to FIG. 4, the sixth step in performing a read query, once the authentication has been set up successfully, is for the tag 206 to use $R^t_n$ to encrypt the data $D_{Aj}$ within $A_j$ by creating the element $G\{R^t_n\} \oplus D_{Aj}$ and passing it to the backend system 202. Finally, the tag 206 will update the secret information by performing $s_{i+1}=H\{s_i\}$ and incrementing $T_x$ by 1. The seventh step occurs when the backend system 202 receives the element $G\{R^t_n\} \oplus D_{Aj}$. The backend system 202 computes $G\{R^b_n\}$ and then performs an XOR with the received $G\{R^t n\} \oplus D_{A,P}$ since $G\{R^b_n\} \oplus G\{R^t_n\} \oplus D_{Aj}=D_{Aj}$ if and only if $R^b_n=R^t_n$. At this point, the read access procedure for this session is completed.

Both the tag outputs in steps two and four are randomized to a certain extent since the former has a different $s_i$ for different transactions and a random session number, $R^t n$, is being employed in the latter. Exemplary embodiments satisfy the security requirements, i.e., for indistinguishability and forward security as follows. G is a one-way function, so if the adversary (or eavesdropper) watches the tag output, he cannot link $G\{s_i \oplus T_x\}$ and $G\{s_{+1} \oplus T_x\}$. H is a one-way hash function, so if the adversary tampers with a tag 206 and obtains the $s_i$ in the tag 206, he cannot know $s_i$ from $s_{i+1}$. Moreover, since a different random session number is being used for doing XOR with the required data in different transactions, the scheme also achieves the requirements of encrypted data passing. From the viewpoint of efficiency, the exemplary embodiments described herein are efficient enough to yield low-cost RFID tags 206, since they utilized only operations that require a small gate size. Thus, exemplary embodiments are practical for low-cost RFID tags 206, while still ensuring privacy.

Figure 5:
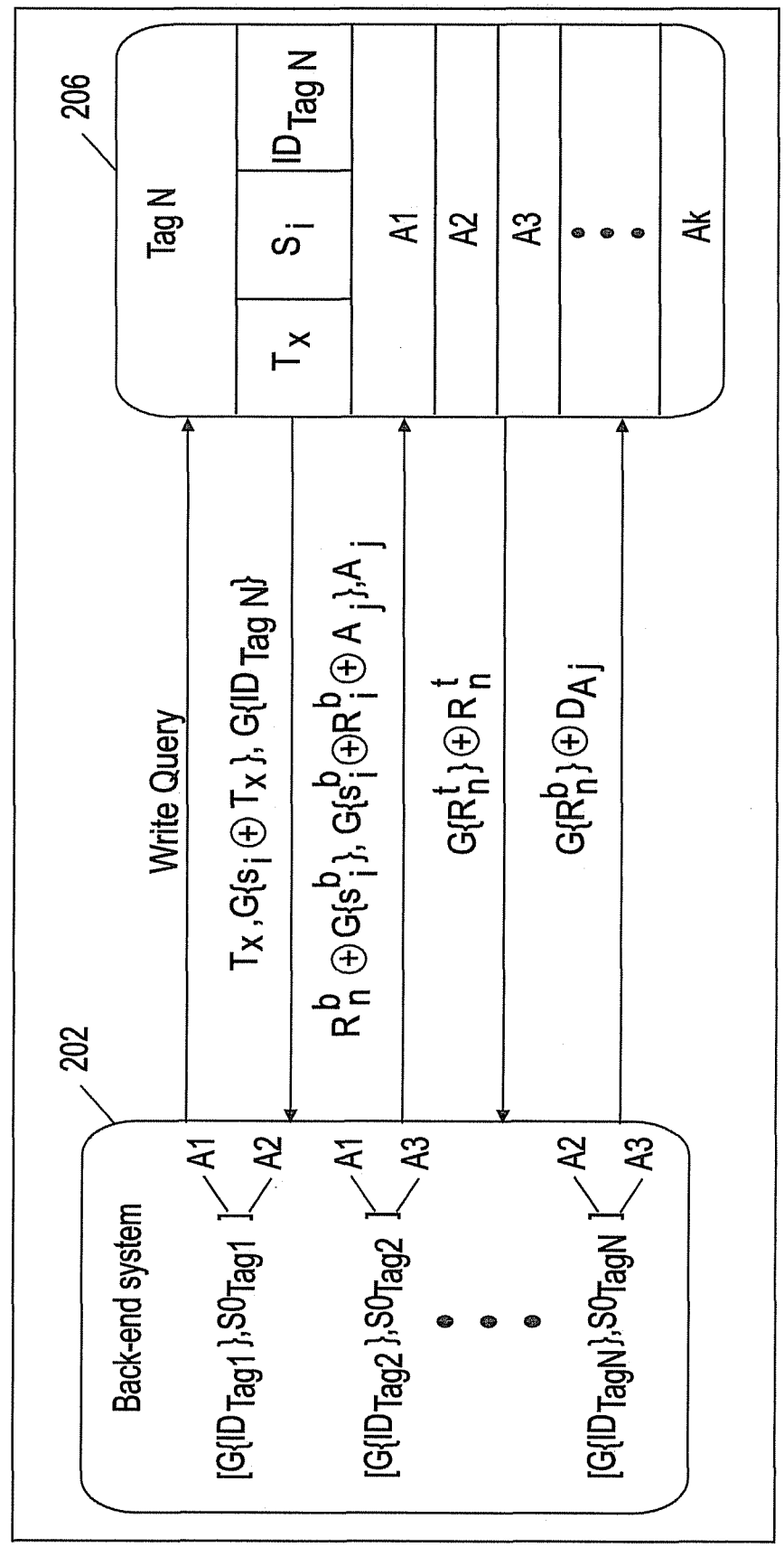
FIG. 5 is a block diagram of a write process that may be implemented by exemplary embodiments.

FIG. 5 is a block diagram of a write process that may be implemented by exemplary embodiments. In exemplary embodiments, the first five steps are the same as the first five steps of the read process described above in reference to FIG. 4. The sixth step in performing a query type of write, once the authentication has been set up successfully, is for the tag 206 to pass the element $G\{R^t_n\} \oplus R^t_n$ to the backend system 202 for illustrating that it is ready to receive the data to be written on $A_j$. This can be regarded as an acknowledgement from the tag 206. The seventh step is performed when the backend system 202 receives the element from the tag 206. The backend system 202 performs checking by computing $G\{R^b_n\}$ and doing XOR with the acknowledgement $G\{R^t_n\} \oplus R^t_n$ for extracting back $R^b_n$ since $G\{R^b_n\} \oplus G\{R^t_n\} \oplus R^t_n=R^b_n$ if and only if $R^b_n=R^t_n$.

The eighth step in performing a write query, as depicted in FIG. 5, occurs when the backend system 202 has completed acknowledgement checking. The backend system 202 uses $R^b_n$ to encrypt the data $D_{Aj}$ for work area $A_j$ by creating the element $G\{R^b_n\} \oplus D_{Aj}$ and passing it to the tag 206. At the ninth step, the tag 206 receives the element $G\{R^b_n\} \oplus D_{Aj}$. The tag can compute $G\{R^t_n\}$ and then do XOR with the received $G\{R^b_n\} \oplus D_{Aj}$, since $G\{R^t_n\} \oplus G\{R^b_n\} \oplus D_{Aj}=D_{Aj}$ if and only if $R^b_n=R^t_n$. At this point, the write access procedure is fully completed. Finally, the tag 206 will update the secret information by performing $s_{i+1}=H\{s_i\}$ and increments $T_x$.

Figure 6:
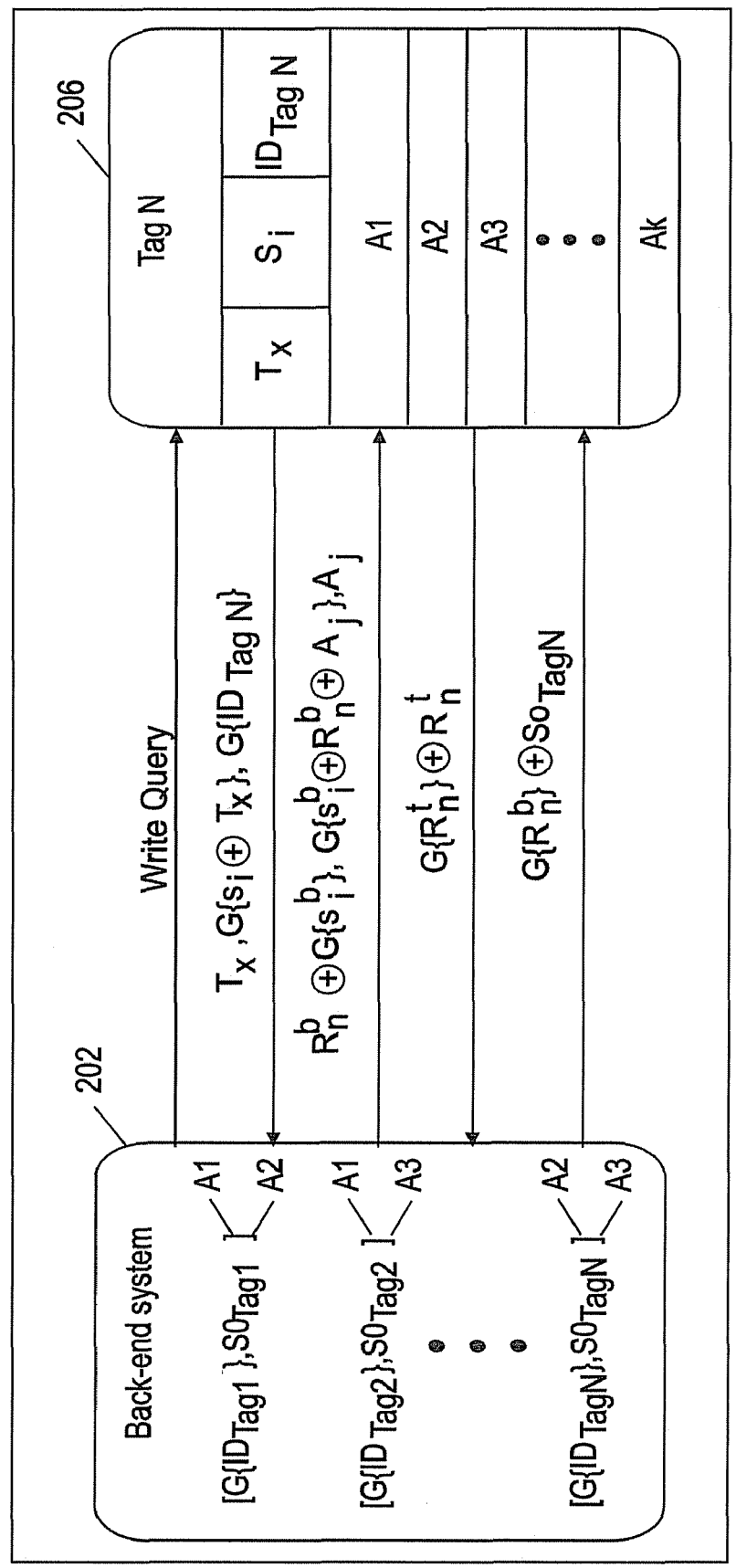
FIG. 6 is a block diagram of a transaction counter reset process that may be implemented by exemplary embodiments.

FIG. 6 is a block diagram of a transaction count reset process that may be implemented by exemplary embodiments. As described herein, in exemplary embodiments, the transaction counter, $T_x$, is incremented after each read/write access transaction. There may exist a point that the value of $T_x$ is so large that performing $s^b_i=H^{Tx}\{s_0\}$ from the backend system 202 is computationally expensive. Hence, another operation, reset, may be utilized to reset the value of $T_x$ to its initial value 1. The reset query is invoked by the backend system 202.

Basically, the reset operation is the same as the write access case described above in reference to FIG. 5 with the exception of passing $G\{R^b_n\} \oplus s_0$ instead of $G\{R^b_n\} \oplus D_{Aj}$. Once the tag 206 receives it, it can get back the initial secret information $s_0$ by doing an XOR with $G\{R^b_n\} \oplus s_0$ since $G\{R^t_n\} \oplus G\{R^b_n\} \oplus s_0=s_0$ if and only if $R^b_n=R^t_n$. Finally, it will reset $T_x$ to 1.

Alternate exemplary embodiments provide an enhanced mutual authentication protocol for simultaneous tag access. It may be implemented when there is a need for a tag 206 to be accessible by different roles of access of multiple backend systems 202. To allow multiple backend systems 202 to access the tag 206 or simultaneously, the exemplary authentication algorithm describes herein may be modified in the following manner. Modifications to the tag 206 include: different access roles are defined such as system administration, inventory management, and pricing; different secret messages $S_0$ are created to correspond to different access roles; each access role is associated with one or more work areas on the tag 206; and the tag's secret message, $s_0$, is replaced by the triplet: ($G\{accessRole\}$, $s_{0\ accessRole}$, {list of authorized work areas}). An example of the new triplet can be ($G\{InventoryManagementCode\}$, $s_{0\ InventoryManagement}$, $\{A_3, A_4\}$).

The backend system 202 is also modified to provide an enhanced mutual authentication protocol for simultaneous tag access. To initiate a process, the backend system 202 passes the parameter $G\{accessRole\}$ along with the initial query (Read/Write/Reset) to the tag 206. When the tag 206 receives a query from the backend system 202, it uses the given $G\{accessRole\}$ to look up the correct secret message, $s_{0\ accessType}$. Then, it passes the three parameters ($T_x$, $G\{s_{0\ accessType} \oplus T_x\}$, $G\{ID_{TagN}\}$) to the backend system 202 as described previously herein. In this example, $T_x$ is the transaction counter, $s_{0\ accessRole}$ is the secret message for a given access role, $ID_{TagN}$ is the identifier of the tag 206, and G is a one-way hash function. Once the tag 206 is authenticated with the backend system 202, the backend system 202 is authenticated with the tag 206 by passing various parameters including the work area that it would like to access as described before. Based on the previously given access role, if the tag 206 does not find an authorized work area that matches the incoming request, the backend system 202 is not authenticated with the tag 206.

Assuming that a tag 206 can be accessed by multiple backend systems 202, it is possible that the tag 206 is handling multiple requests from different backend systems 202 at the same time. In this case, a method is implemented to control the transaction counter, $T_x$, from being incremented by 1 or being reset at the end of a read/write query by a first backend system 202 while a second backend system 202 reads the same transaction counter and has not yet finished its transaction. To solve this conflict, a session number is created for each request made by each backend system 202. For each backend system 202 that passes a request to the tag 206, the tag 206 generates a session number for each backend system 202. Then, the list of session numbers is associated with the current transaction counter at the tag 206. For example if both the first and second backend systems 202 are accessing the tag 206 simultaneously, the tag 206 stores the relationship: $T_x \rightarrow$ (SessionID$_1$, SessionID$_2$), where "→" indicates an association, $T_x$ is the transaction counter, SessionID$_1$ is the session ID assigned to the session used by the first backend system 202, and SessionID$_2$ is the session ID assigned to the session used by the second backend system 202. When a backend system 202 finishes its session, the tag 206 removes the session ID from the association with the transaction counter. Therefore, a transaction counter can be incremented or reset if it is not associated with any session ID, which indicates that the new transaction counter will not affect or corrupt the authenticated process between any backend system 202 and the tag 206.

In further exemplary embodiments, the tag 206 is equipped with a counter/timer to set the maximum allowed transaction duration for processing each backend system 202 request. If the backend system 202 does not finish its operations within a given period, the session is over, and the tag 206 will stop its communication with the backend system 202, as well as removing the session ID from the association with the transaction counter. When this occurs, the backend system 202 will need to re-establish the authentication process with the tag 206. This is to protect the case when the transaction is interrupted by external sources on the backend system 202, the reader 204 or at the tag 206.

The ability to provide simultaneous access of the RFID tag 206 by multiple backend systems 202 allows the creation of an access control mechanism using access role in additional to authentication performed at the RFID tag 206. Each access role is associated with a secret message and a list of work areas on the tag 206. In addition, multiple layers of security are created the backend system 202 is allowed to access the work areas if and only if it knows the tag's secret message, its own access role and authorized work areas on the tag 206 ahead of time. If the backend system 202 is authenticated with the tag 206 but fails to identify the correct authorized work areas it would like the request to be processed, it is not allowed to access the tag 206. Further, a session ID may be utilized to control multiple transactions handled simultaneously at the tag side by preventing the current transaction counter from incrementing until it is not associated with any session ID.

Technical effects and benefits of exemplary embodiments include the ability to implement a relatively low cost and lightweight mutual authentication protocol for RFID networks that utilize passive tags.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for providing mutual authentication for radio frequency identification (RFID) security, the method comprising:
   receiving an authentication request at a RFID tag from a requestor, the request including an encrypted access role;
   transmitting an encrypted secret message to the requestor in response to receiving the authentication request, the encrypted secret message responsive to the encrypted access role;
   receiving an access request at the RFID tag from the requestor, the access request generated by the requestor in response to the RFID tag being successfully authenticated by the requestor using the encrypted secret message, and the access request specifying a work area and including a random number that is encrypted;
   authenticating the requester at the RFID tag including determining the value of the random number sent by the requestor and verifying that the work area is valid for the encrypted access role; and
   responding to the access request using the value of the random number as an encryption key in response to the requestor being successfully authenticated at the RFID tag, wherein the RFID tag responds to simultaneous accesses by the requester and one or more other requesters.

2. The method of claim 1 wherein the access request is a read query.

3. The method of claim 1 wherein the access request is a write query.

4. The method of claim 1 wherein the access request is a reset query.

5. The method of claim 1 wherein the requester is a backend system.

6. The method of claim 1 further comprises authenticating the RFID tag at the requester, the authenticating including verifying that the encrypted secret message contains an expected value.

7. The method of claim 1 wherein one or more of the authentication request and the access request are encrypted.

8. The method of claim 1 wherein the encrypted secret message is created by applying a hash function to a secret message associated with the RFID tag and the encrypted access role.

9. A system for providing a mutual authentication protocol for RFID networks, the system comprising an RFID tag including:
one or more secret messages;
one or more work areas;
one or more hash functions for encrypting data; and
instructions to facilitate:
receiving an authentication request at the RFID tag from a requester,
the request including an encrypted access role;
transmitting an encrypted secret message to the requester in response to receiving the authentication request, the encrypted secret message created by encrypting one of the secret messages corresponding to the encrypted access role;
receiving an access request at the RFID tag from the requester, the access request generated by the requester in response to the RFID tag being successfully authenticated by the requestor using the encrypted secret message, and the access request specifying a work area and including a random number that is encrypted;
authenticating the requestor at the RFID tag including determining the value of the random number sent by the requester and verifying that the work area is valid for the encrypted access role; and
responding to the access request using the value of the random number as an encryption key in response to the requester being successfully authenticated at the RFID tag, wherein the RFID tag responds to simultaneous accesses by the requester and one or more other requesters.

10. The system of claim 9 wherein the RFID tag is a passive RFID tag.

11. The system of claim 9 wherein the requester is a backend system.

12. The system of claim 9 further comprising a backend system for authenticating the RFID tag and for generating and transmitting the authentication and access requests.

13. The system of claim 9 further comprising a RFID reader for transmitting data between the requestor and the RFID tag.

14. A computer program product for providing mutual authentication for RFID security, the computer program product comprising:
a storage medium readable by a processing circuit and storing instructions for execution by the processing circuit for facilitating:
receiving an authentication request at a RFID tag from a requester, the request including an encrypted access role;
transmitting an encrypted secret message to the requestor in response to receiving the authentication request, the encrypted secret message responsive to the encrypted access role;
receiving an access request at the RFID tag from the requester, the access request generated by the requester in response to the RFID tag being successfully authenticated by the requester using the encrypted secret message, and the access request specifying a work area and including a random number that is encrypted;
authenticating the requester at the RFID tag including determining the value of the random number sent by the requester and verifying that the work area is valid for the encrypted access role; and
responding to the access request using the value of the random number as an encryption key in response to the requestor being successfully authenticated at the RFID tag, wherein the RFID tag responds to simultaneous accesses by the requester and one or more other requesters.

15. The storage medium of claim 14 wherein the access request is one or more of a read query, a write query, and a reset query.

16. The storage medium of claim 14 wherein the requester is a backend system.

17. The storage medium of claim 14 wherein the instructions further facilitate authenticating the RFID tag at the requester, the authenticating including verifying that the encrypted secret message contains an expected value.

* * * * *